US012748119B2

(12) United States Patent
Dolan et al.

(10) Patent No.: US 12,748,119 B2
(45) Date of Patent: Sep. 29, 2026

(54) METHODS AND SYSTEMS FOR TRACKING PERFORMANCE CHARACTERISTICS OF PROBES FOR A BIOMANUFACTURING SYSTEM

(71) Applicant: Culture Biosciences, Inc., South San Francisco, CA (US)

(72) Inventors: Sean Dolan, South San Francisco, CA (US); William Bond, South San Francisco, CA (US); Collin Edington, South San Francisco, CA (US); Salvador Mireles, South San Francisco, CA (US); Satshabad Khalsa, South San Francisco, CA (US)

(73) Assignee: Culture Biosciences, Inc., South San Francisco, CA (US)

( * ) Notice: Subject to any disclaimer, the term of this patent is extended or adjusted under 35 U.S.C. 154(b) by 193 days.

(21) Appl. No.: 18/419,195

(22) Filed: Jan. 22, 2024

(65) Prior Publication Data

US 2024/0248104 A1 Jul. 25, 2024

Related U.S. Application Data

(60) Provisional application No. 63/440,844, filed on Jan. 24, 2023.

(51) Int. Cl.
*G01N 35/00* (2006.01)
*G06F 16/907* (2019.01)

(52) U.S. Cl.
CPC . *G01N 35/00623* (2013.01); *G01N 35/00732* (2013.01); *G06F 16/907* (2019.01); *G01N 2035/00752* (2013.01)

(58) Field of Classification Search
CPC .......... G01N 2035/00851; G01N 2035/00841; G01N 2035/00801; G01N 2035/00811;
(Continued)

(56) References Cited

U.S. PATENT DOCUMENTS 6,617,963 B1 * 9/2003 Watters .................. G01K 5/483 360/60
6,861,954 B2 * 3/2005 Levin ...................... A61F 13/44 606/1

(Continued)

FOREIGN PATENT DOCUMENTS

WO WO-2020167676 A1 * 8/2020 .............. B01F 33/86

OTHER PUBLICATIONS

International Searching Authority (USPTO); Notification of Transmittal of the International Search Report and the Written Opinion of the International Searching Authority, or the Declaration; dated Jun. 5, 2024; PCT Application No. PCT/US2412525 filed Jan. 23, 2024; pp. 1-15 (2024).

(Continued)

*Primary Examiner* — Tran M. Tran
(74) *Attorney, Agent, or Firm* — Kevin Jablonski; FisherBroyles, LLP

(57) ABSTRACT

Methods and systems for tracking use of sensor probes in a biomanufacturing environment. A typical sensor probe includes an elongated cylindrical body that may include a hollow inner cavity exposed at the bottom end of the elongated cylindrical body along with a probe ID. A method may include affixing this trackable ID to one or more sensor probes such that the trackable ID may be associated with a dedicated probe sensor data set stored in a cloud data store. Further, initial meta data may be assigned to the probe's the respective could data set that includes additional initial details about the associated sensor probe, such as make and manufacture of the probe, operating parameters of the probe, unique ID number, and/or expected lifespan statistics (number of uses expected, number of calibrations expected, number or autoclaves expected, and the like).

20 Claims, 5 Drawing Sheets

(58) Field of Classification Search
CPC .......... G01N 2035/00; G01N 35/00623; G06F 16/907; G07C 3/005; G07C 3/14; G07C 3/146; G06Q 10/06315; B01D 46/46
See application file for complete search history.

(56) References Cited

U.S. PATENT DOCUMENTS

| | | | | |
|---|---|---|---|---|
| 7,035,877 | B2 * | 4/2006 | Markham | G05B 19/41875 |
| 7,898,495 | B2 * | 3/2011 | Burke | B01D 46/4245 343/872 |
| 7,969,380 | B2 * | 6/2011 | Burke | H01Q 9/16 96/417 |
| 8,501,119 | B2 * | 8/2013 | Burke | H01Q 1/22 422/549 |
| 9,050,379 | B2 * | 6/2015 | Selker | A61L 2/081 |
| 9,095,498 | B2 * | 8/2015 | Baumfalk | B01L 3/52 |
| 9,782,506 | B2 * | 10/2017 | Selker | G06K 7/10366 |
| 9,946,902 | B2 * | 4/2018 | Nyffeler | G06K 19/14 |
| 9,984,322 | B2 * | 5/2018 | Reynolds, IV | A61L 2/07 |
| 10,001,454 | B2 * | 6/2018 | Schick | G01N 27/4167 |
| 10,049,128 | B1 * | 8/2018 | Zhang | G16C 20/30 |
| 10,970,614 | B2 * | 4/2021 | Fadell | G01L 19/086 |
| 11,144,808 | B2 * | 10/2021 | Koekemoer | E02F 9/267 |
| 11,542,464 | B2 * | 1/2023 | Grimm | C12M 41/12 |
| 11,773,361 | B2 * | 10/2023 | Shevitz | B01F 35/146 435/289.1 |
| 12,055,417 | B2 * | 8/2024 | Hartmann | G01K 1/024 |
| 12,443,920 | B2 * | 10/2025 | MacDonald | G16H 70/40 |
| 2002/0076819 | A1 * | 6/2002 | Bowman | A61B 10/0096 436/56 |
| 2003/0160698 | A1 * | 8/2003 | Andreasson | G16H 20/13 705/3 |
| 2003/0174046 | A1 * | 9/2003 | Abrams | G01N 35/00871 340/5.92 |
| 2005/0205658 | A1 * | 9/2005 | Baker | G06Q 10/08 235/375 |
| 2007/0200703 | A1 * | 8/2007 | Baker | G06K 7/0008 340/572.1 |
| 2009/0204250 | A1 * | 8/2009 | Potyrailo | G06K 19/0723 700/109 |
| 2009/0256679 | A1 * | 10/2009 | Potyrailo | H04Q 9/00 340/10.1 |
| 2012/0065782 | A1 | 3/2012 | West | |
| 2014/0200840 | A1 * | 7/2014 | Cox | G01D 18/00 702/188 |
| 2014/0269812 | A1 * | 9/2014 | Deutscher | G01K 7/18 374/1 |
| 2018/0216059 | A1 | 8/2018 | Eisenkraetzer et al. | |
| 2021/0002597 | A1 | 1/2021 | Jaques et al. | |
| 2021/0009936 | A1 | 1/2021 | Kamen et al. | |
| 2021/0040435 | A1 | 2/2021 | Ball et al. | |
| 2021/0271235 | A1 | 9/2021 | Selker et al. | |
| 2021/0332316 | A1 * | 10/2021 | Grimm | C12M 23/28 |
| 2021/0338233 | A1 | 11/2021 | Shelton, IV et al. | |
| 2022/0002652 | A1 | 1/2022 | Patrick et al. | |
| 2022/0225901 | A1 * | 7/2022 | Chapman | A61B 5/1495 |

OTHER PUBLICATIONS

Luftman, “DO & pH Probe Calibration for Optimized Measurement Results in Biopharma”, Mar. 16, 2018, [onlineJ, [retrieved on May 20, 2024]. Retrieved from the Internet <URL: https://proanalytics.neUdo-ph-probe-Luftman, DO & pH Probe Calibration for Optimized Measurement Results in Biopharma, 16 calibrationmeasuremenU#:-:text=The%20dissolved%20oxygen%20probe%20calibration, saturated%20m edium%20at%20process%20temperature.>, pp. 1 to 7, especially pp. 1 to 2 (2018).

* cited by examiner

METHODS AND SYSTEMS FOR TRACKING PERFORMANCE CHARACTERISTICS OF PROBES FOR A BIOMANUFACTURING SYSTEM

CLAIM OF PRIORITY

This application claims the benefit of U.S. Provisional Application No. 63/440,844 entitled "METHODS AND SYSTEMS FOR TRACKING PERFORMANCE CHARACTERISTICS OF PROBES FOR A FERMENTATION SYSTEM" filed Jan. 24, 2023, which is incorporated by reference in its entirety herein for all purposes.

BACKGROUND

Biomanufacturing is a technology that utilizes biological systems to produce commercially important biomaterials and biomolecules for use in medicines, food and beverage processing, and industrial applications. Biomanufacturing products may be generated from cultures of microbes, animal cells, or plant cells grown in specialized equipment. The cultured seeds used during production may be naturally occurring or derived using genetic engineering techniques. When using one or more bioreactors, one may develop automated processes that assist biotech companies to optimize manufacturing processes and to facilitate bringing products to market faster. Typical biomanufacturing processes can be very time consuming and require a large amount of manual handling by a trained individual in a contaminant-free environment. For example, seed preparation and sample preparation and analysis may also require individualized attention in addition to bioreactions. Such techniques can be particularly burdensome for an experiment that may benefit from high throughput biomanufacturing.

In biomanufacturing systems, probes may typically be used to monitor conditions for each specific bioreactor so that systems for monitoring experiments and/or individuals in charge of facilitating experiments may observe specific measurable parameters for each bioreactor. For example, a probe may be used to monitor the pH of a specific culture, oxygen levels for a specific culture, or other measurable parameters. These feedback parameters allow automated systems and human controllers to adjust each bioreactor individually so as to maintain control over each culture during manufacturing.

As one may expect, the probes used in each bioreactor may deteriorate over time due to repeated use—especially with respect to monitoring pH levels as initial characteristics of the probes may shift after repeated and prolonged use. Without tracking each probe individually, laboratories would simply treat all probes as either "still good" or in need of replacement. As a result, this all or nothing decision was simply based on the number of uses or the passage of time regardless of whether each probe needed maintenance or not. This is inefficient and does not accurately reflect reality.

BRIEF DESCRIPTION OF THE DRAWINGS

Embodiments of the subject matter disclosed herein in accordance with the present disclosure will be described with reference to the drawings, in which.

Note that the same numbers are used throughout the disclosure and figures to reference like components and features.

DETAILED DESCRIPTION

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced. These systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

Figure 1:
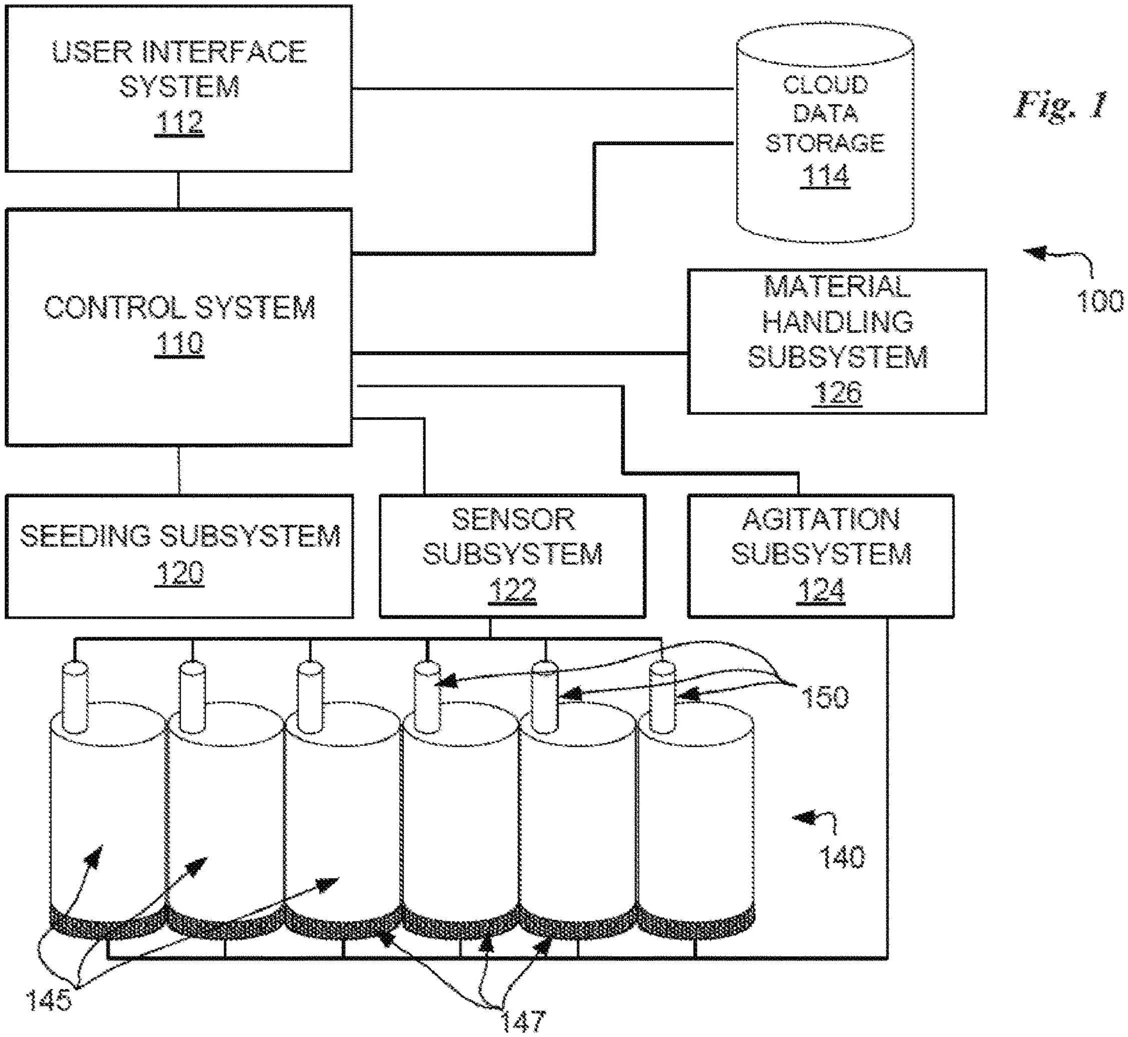
FIG. 1 is a system diagram of a biomanufacturing system in which probes to be tracked may be utilized according to an embodiment of the subject matter disclosed herein.

FIG. 1 is a system diagram of a biomanufacturing system 100 in which probes to be tracked may be utilized according to an embodiment of the subject matter disclosed herein. Various aspects of the biomanufacturing system 100 described herein may be applied to any of the particular applications set forth below. The system includes several functional blocks and devices that may include subsystems that utilize one or more processors for automation and tracking. The biomanufacturing system 100 may utilize an array of bioreactors 140 (sometimes called work cells) or may be implemented using a single bioreactor. Whether an array or a single bioreactor 140, the biomanufacturing system 100 may include additional subsystems for bioreactor control, data collection and data analysis as will be described below. It shall be understood that different aspects of the biomanufacturing system 100 can be appreciated individually, collectively or in combination with each other.

Biomanufacturing processes can be used for many applications. For instance, biomanufacturing can be utilized for production of biomass (e.g., viable cellular material), production of extracellular metabolites (e.g., chemical compounds), production of intracellular components (e.g., enzymes and other proteins), or transformation of a substrate (e.g., the substrate itself may be a product). Biomanufacturing processes are useful for biological experiments, drug manufacturing, food industry, biofuels, and many other applications. In some instances, it may be desirable to provide automated biomanufacturing systems and methods that allow for low risk of contamination, high levels of accuracy and repeatability, high throughput, controlled variations, quicker turnaround, and/or require less manpower.

FIG. 1 shows a block diagram of an overall biomanufacturing system 100 that may include an automated seeding subsystem 120, a bioreactor sensor subsystem 121, a bioreactor agitation subsystem 124, and/or a material handling subsystem 126. Each of these subsystems may be communicatively coupled to a control system 110 that is associated with a user-interface system 112 and a cloud-based database 114. The biomanufacturing system 100 may optionally include an enclosure (not shown). The enclosure may comprise a sterile enclosure that prevents contaminants from coming inside the enclosure. The area within the biomanufacturing system 100 is a clean, sterile environment, thereby reducing the risk of contamination to the experiments. The enclosure may partially or completely enclose each subsystem of the biomanufacturing system 100. The enclosure may be substantially fluid-tight and may be airtight and/or liquid-tight. In some embodiments, multiple enclosures may be provided. One or more stations or components may be provided in separate enclosures.

As briefly discussed above, the bioreactor array 140 may comprise multiple bioreactors 145 that each include one or more respective individual sensor probes 150 for monitoring conditions of the environment inside each bioreactor 145 as well as individual agitators 147 for provides agitation for each bioreactor 145. Each vessel (e.g., each bioreactor) may be associated with multiple probes each configured to determine a specific characteristic of the solution in the vessel such as pH level, temperature via a thermocouple (or the like), and dissolved oxygen (DO) levels. In some embodiments, these characteristics may be determined by a single probe configured to determine pH levels, temperature and DO levels simultaneously, or any combination of two or more characteristics. In still further embodiments, combinations of different characteristics may be determined by one probe with multiple characteristic sensing capabilities. Further, each probe may be communicatively coupled to the sensor subsystem 122 and each agitator 147 may be communicatively coupled to the agitation subsystem 124. Collectively, these subsystems may be under the control and direction of the control system 110 whereupon a user may utilize the user interface system 112 to control and direct the activities and procedures of the overall biomanufacturing system 100. Further, data about the control, state, and productions of the biomanufacturing system 100 may be communicated and stored in a cloud-based data store 114.

One or more processes within the biomanufacturing system 100 may be fully automated. That is, any process may be automated and executed without requiring human intervention. Further, such processes may be automated with the aid of one or more processors embodied in one or more computer systems. In some embodiments, transfer of materials from a seeding subsystem 120 to the bioreactor array 140 may be fully automated. In some embodiments, transfer of materials from the bioreactor array 140 to the material-handling subsystem 124 may be fully automated. In some embodiments, one or more robotic components may aid in the automated processes. In some cases, one or more robotic components may comprise one or more robotic arms or other robotic components such as gantry.

As discussed previously, the biomanufacturing system 100 may comprise one or more bioreactors 145 within a bioreactor array 140. Each bioreactor may correspond to an experiment. Each bioreactor 145 may correspond to an individual biomanufacturing process, which may be associated with a unique, individual experiment. Each bioreactor 145 may be independently operating and/or controllable relative to another bioreactor in the bioreactor array 140. Any number or arrangement of bioreactors 145 may be provided, as provided in greater detail elsewhere herein. Further yet, one or more modular components may be provided in the biomanufacturing system 100. For instance, components, such as bioreactors 145 and/or other equipment (e.g., sensor probes 150, agitators 147, and the like) may be swapped in or out as needed.

Each individual bioreactor 145 may be seeded with input strains from the seeding subsystem 120. For strain input, a strain or set of strains may be provided to the bioreactor 145. Any description herein of providing an input strain may be applied to providing a set of input strains or multiple input strains. An input strain may be provided via one or more tubes, frozen stocks, plates, beads, wells, channels, or any other technique. The input strain may be provided manually or may be loaded in an automated fashion. In some embodiments, the bioreactor 145 may be capable of accommodating multiple types of strain inputs. For example, the bioreactor 145 may be able to accept one or more tubes, and/or one or more plates with an input strain or set of input strains. Similarly, each individual bioreactor 145 may be populated with media from the seeding subsystem 120. Any description herein of providing media may also be applied to providing a set of input strains or multiple input strains or vice versa.

Each individual bioreactor 145 may include one or more sensor probes 150 for detecting conditions of any media therein. These conditions may include pH levels, temperature, oxygen levels, cell density, biomass, glucose levels, lactate levels, and the like. The biomanufacturing system may include additional sensors (not shown) used to monitor and detect additional conditions (e.g., volume, weight, height, and the like). Such additional sensors for additional conditions are not the subject of the present application and are not discussed further herein. However, as is discussed further below, the sensor probes 150 as shown, typically require calibration after one or more uses and, as with any sensor probe 150, may be prone to degradation and failure. As such, after each use, these sensor probes 150 may undergo testing and calibration procedures to ensure optimal operating conditions. Such testing and calibration procedures are discussed next with respect to FIG. 2-5.

Figure 2:
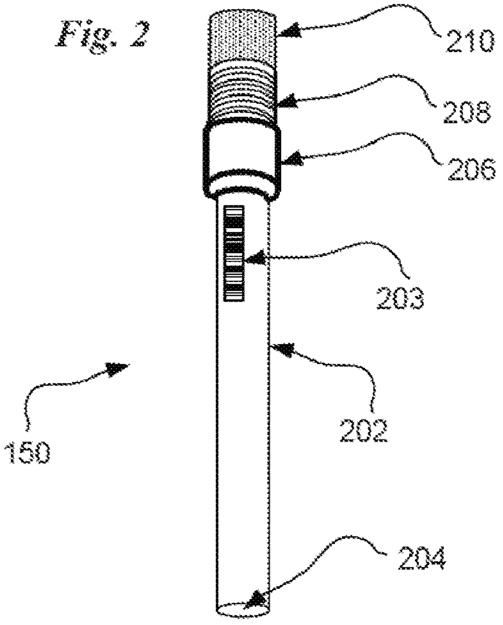
FIG. 2 is a diagram of a probe for use in a probe tracking system according to an embodiment of the subject matter disclosed herein.

FIG. 2 is a diagram of a sensor probe 150 for use in a probe tracking system according to an embodiment of the subject matter disclosed herein. In this depiction, a typical sensor probe 150 includes an elongated cylindrical body 202 that may include a hollow inner cavity 204 exposed at the bottom end of the elongated cylindrical body 202. Further, the elongated cylindrical body 202 may include a probe ID 203. In this embodiment, the probe ID is depicted as a bar code unique to each specific sensor probe 150. In other embodiments, any manner of a probe ID 203 may be used including unique serial numbers or unique QR codes. In an embodiment discussed further below with respect to FIG. 5, a method may include affixing this trackable ID 203 to one or more sensor probes 150 such that the trackable ID 203 may be associated with a dedicated probe sensor data set stored in a cloud data store. Further, initial meta data may be assigned to the probe's the respective could data set that includes additional initial details about the associated sensor probe, such as make and manufacture of the probe, operating parameters of the probe, unique ID number, and/or expected lifespan statistics (number of uses expected, number of calibrations expected, number or autoclaves expected, and the like).

The elongated cylindrical body 202 is designed to be submersed in media (or at least in contact with media) within a bioreactor 145 and secured to a lid of a bioreactor 145 with a threaded head end 208. That is, the threads of the threaded head end 208 are configured to rotatably engage with an orifice in a lid or top side of any bioreactor 145 thereby making the sensor probes 150 interchangeable between any bioreactor 145. Further, the sensor probe 150 includes a rubber seal 206 designed to provide a fluid-tight interface between the sensor probe 150 and the orifice of the top side of the bioreactor 145. Further, the sensor probe 150 includes a communication module 210 designed to interface a communication lead (not shown) from the sensor subsystem of FIG. 1. In some embodiments, the communication lead may be a physical electrical wire suitable for sensor transmissions and communications. In other embodiments, the communication module 210 may be configured for wireless communication (e.g., near-field communication, Wi-Fi and the like).

The probe 150 may be configured to detect characteristics of the contents of its respectively engaged bioreactor. For example, in one embodiment, the probe 150 may be configured to determine pH levels of the contents. In another example, the probe may be configured to determine relative temperatures of the contents. In still further examples, the probe 150 may be configured to determine DO levels of the contents. In some embodiments, the probe may be configured to perform more than one of these example detections.

As will become evident further, sometimes the ability of a probe to perform these detections may be subject to degradation over repeated use. This is especially true for pH detection as probes after each use may be in need of repair and/or recalibration for continued use. Sensor probes 150 may be recalibrated and put back into use, but over time, the ability of sensor probes to accurately determine some solution characteristics, such as pH, may be permanently degraded indicating that such a sensor probe should be retired from use due to lack of accuracy.

Figure 3:
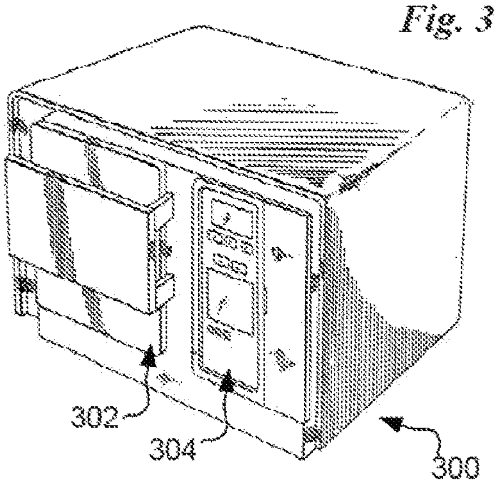
FIG. 3 is a system diagram of an autoclave system for performing an autoclave procedure on one or more of the probes from FIGS. 1 and 2 according to an embodiment of the subject matter disclosed herein.

FIG. 3 is a system diagram of an autoclave system 300 for performing an autoclave procedure on one or more of the sensor probes 145 of FIG. 1 according to an embodiment of the subject matter disclosed herein. An autoclave 300 is a machine used to carry out industrial and scientific processes requiring elevated temperature and pressure in relation to ambient pressure and/or temperature. Autoclaves 300 are typically used in industry for such applications as surgical instruments to perform sterilization, in the chemical industry to cure coatings, to vulcanize rubber, and for hydrothermal synthesis. In the present disclosed procedures, the autoclave system 300 may be used to set (or reset) the pH and temperature sensing capabilities of each individual sensor probe 150.

Many autoclaves include an inner chamber 304 that is used to receive equipment and to sterilize the equipment placed therein by subjecting the equipment to pressurized saturated steam at 250° F. for around 30-60 minutes at a pressure of 15 psi depending on the size of the load and the contents. The autoclave may operate according to settings entered through a control panel 302 by a user. Sterilization autoclaves are widely used in microbiology and mycology, medicine, and prosthetics fabrication. They vary in size and function depending on the media to be sterilized and are sometimes called retort in industry. The autoclave 300, as used herein, may be part of the overall system 400 (described further below) for tracking probes used in the biomanufacturing system 100, but further details about the autoclave are not discussed in further detail.

Figure 4A:
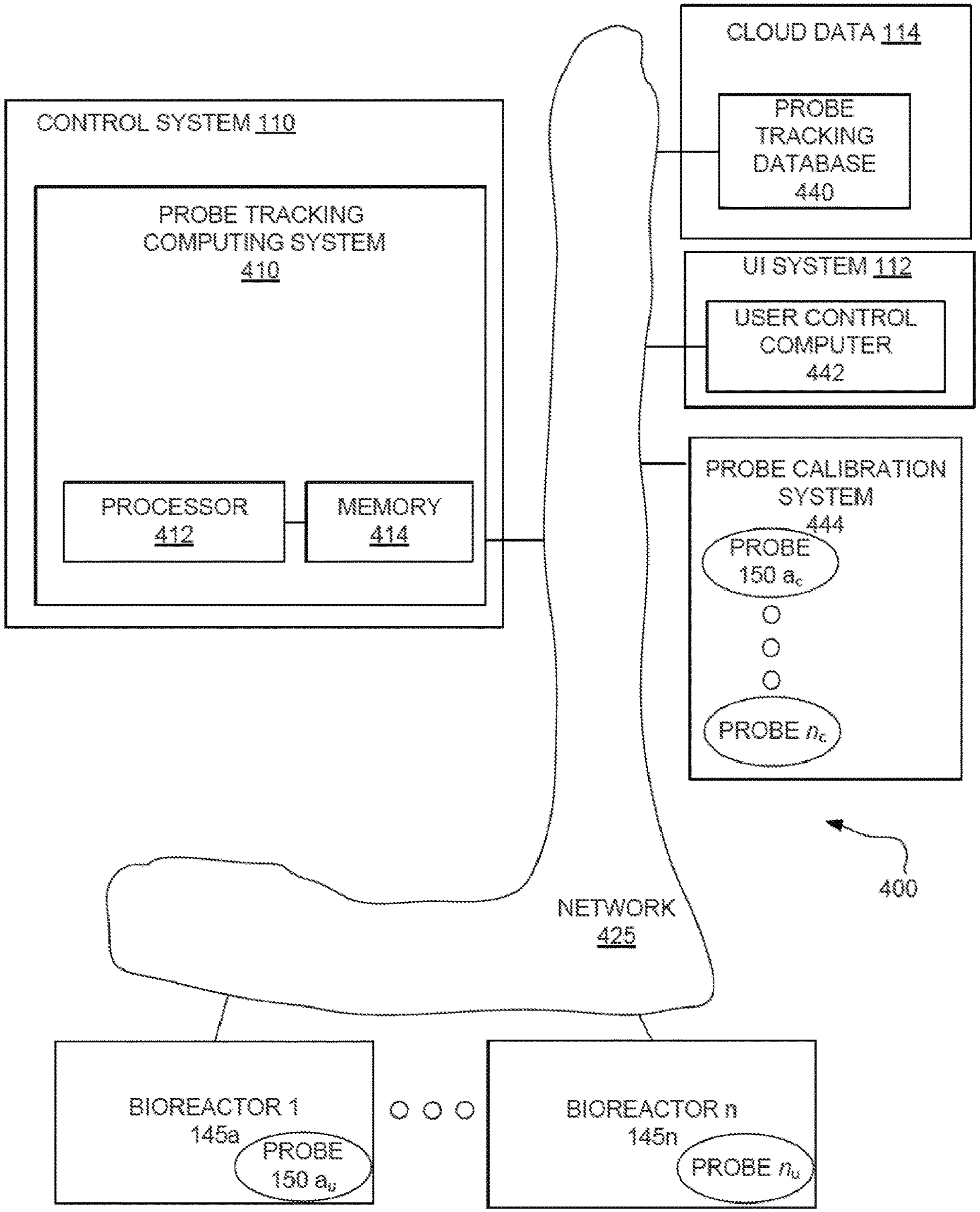
FIG. 4A is a system diagram of a computer system for tracking performance characteristics of one or more of the probes from FIGS. 1 and 2 according to an embodiment of the subject matter disclosed herein.

FIG. 4A is a system diagram of computer system 400 for tracking performance characteristics of one or more of the probes from FIG. 2 according to an embodiment of the subject matter disclosed herein. The various systems and computers described with respect to FIG. 4A may be standalone computer system or part of an overall computing system and/or cloud-based computing system. As such, each of the individual computer systems with FIG. 4A may be communicatively coupled to each other through a computer network 425 such as the Internet.

The overall probe tracking system 400 may be ultimately controlled though use of a control system 110 as depicted in FIG. 1. In the system 400 of FIG. 4A, this may also include a dedicated probe tracking computer system 410 that may include several components such as a processor 412 and local memory 414. The probe tracking computer system 410 may execute instructions stored in the local memory 414 to store meta data about each probe as tracked through each probe ID 203. Thus, at each step of the method discussed below with respect to FIG. 5, meta data about the probe 150 may be stored in a cloud-based database 440 corresponding to each respective probe ID 203 at the direction of the probe tracking computer system 410.

The overall probe tracking system 400 further includes several bioreactor vessels in a bioreactor array that includes, as shown, at least bioreactors 145*a*-145*n* with respective "in-use" probes $\mathbf{150}a_u$-$\mathbf{150}n_u$. A skilled artisan understands that the probes $\mathbf{150}a_u$-$\mathbf{150}n_u$ may represent a respective set of probes for multiple deterministic characteristics (e.g., pH, temperature, DO, or any other probe parameters and characteristics as previously described) for each respective bioreactor that are currently in use. These in-use probes may be queried at any time and often during experiment runs while in use (e.g., dynamic performance characteristics such as error codes, offsets, calibration curves, and actual dedicated sensor data like pH level for probes that are pH probes). Such use data not only informs operators about the progress of experiments but may also be indicative of failed probes that may need to be removed and repaired/recalibrated regardless of the underlying purpose and/or nature of the probes.

The overall probe tracking system 400 further includes a probe calibration system 444 that may be used to test or calibrate respective probes after use. The probe calibration system 444 may test and/or calibrate probes $\mathbf{150}a_c$ through $\mathbf{150}n_c$ that have recently been removed from use in one or more experiments. As is discussed in greater detail below with respect to FIG. 4B and FIG. 5, each tested probe may be determined to pass the test, pass the test with qualification, or fail the test. Calibration or recalibration may remedy any failed or qualified passed test in which case, probes may be returned to a pool of usable and ready sensor probes 150.

Further, cleaning processes may also be used to remedy failed calibration tests by restoring functionality to a dirty or damaged probe. The overall probe tracking system 400 further includes at least a portion of a user Interface system 112 that may be embodied in a local user control computer 442. Further as alluded to, the cloud data 114 of FIG. 1 may be further embodied in one or more localized probe tracking databases 440.

Figure 4B:
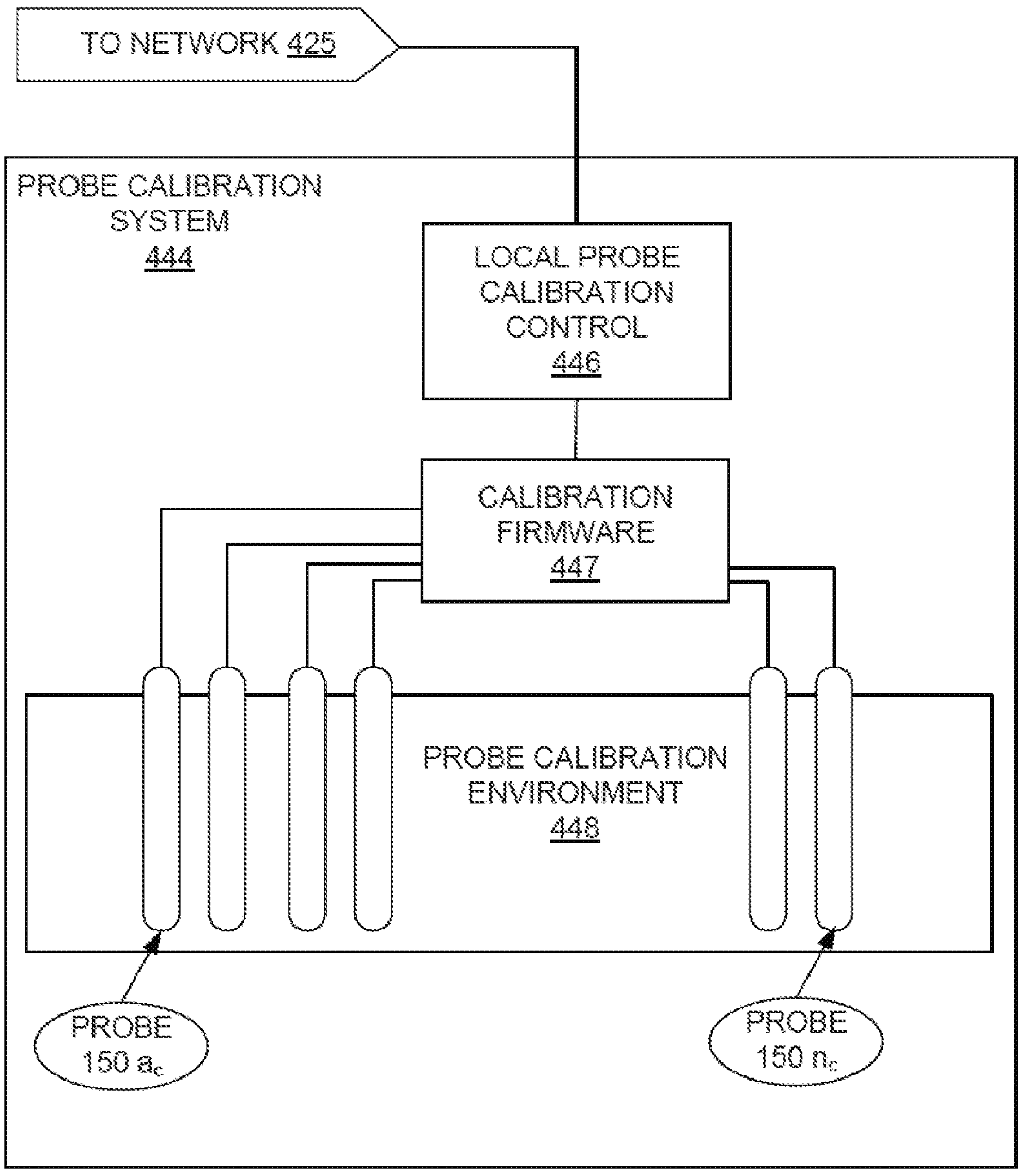
FIG. 4B is a system diagram of probe calibration subsystem within the computer system for tracking performance characteristics of FIG. 4A according to an embodiment of the subject matter disclosed herein.

FIG. 4B is a system diagram of probe calibration subsystem within the computer system for tracking performance characteristics of FIG. 4A according to an embodiment of the subject matter disclosed herein. In FIG. 4B, one can see that the probe calibration system 444 further includes a local probe calibration control system 446 which may be a local networked computer system or the like for local control of a calibration system and instruments. Thus, the local probe calibration control system 446 may be communicatively coupled to the computer network 425 as well as calibration firmware 447 that, in turn controls a probe calibration environment 448 capable of calibrating, testing and verifying multiple probes 150$a_c$-150$a_n$ in a parallel manner, e.g., all probes 150$a_c$-150$a_n$ are calibrated in unison through local control of calibration firmware 447.

Figure 5:
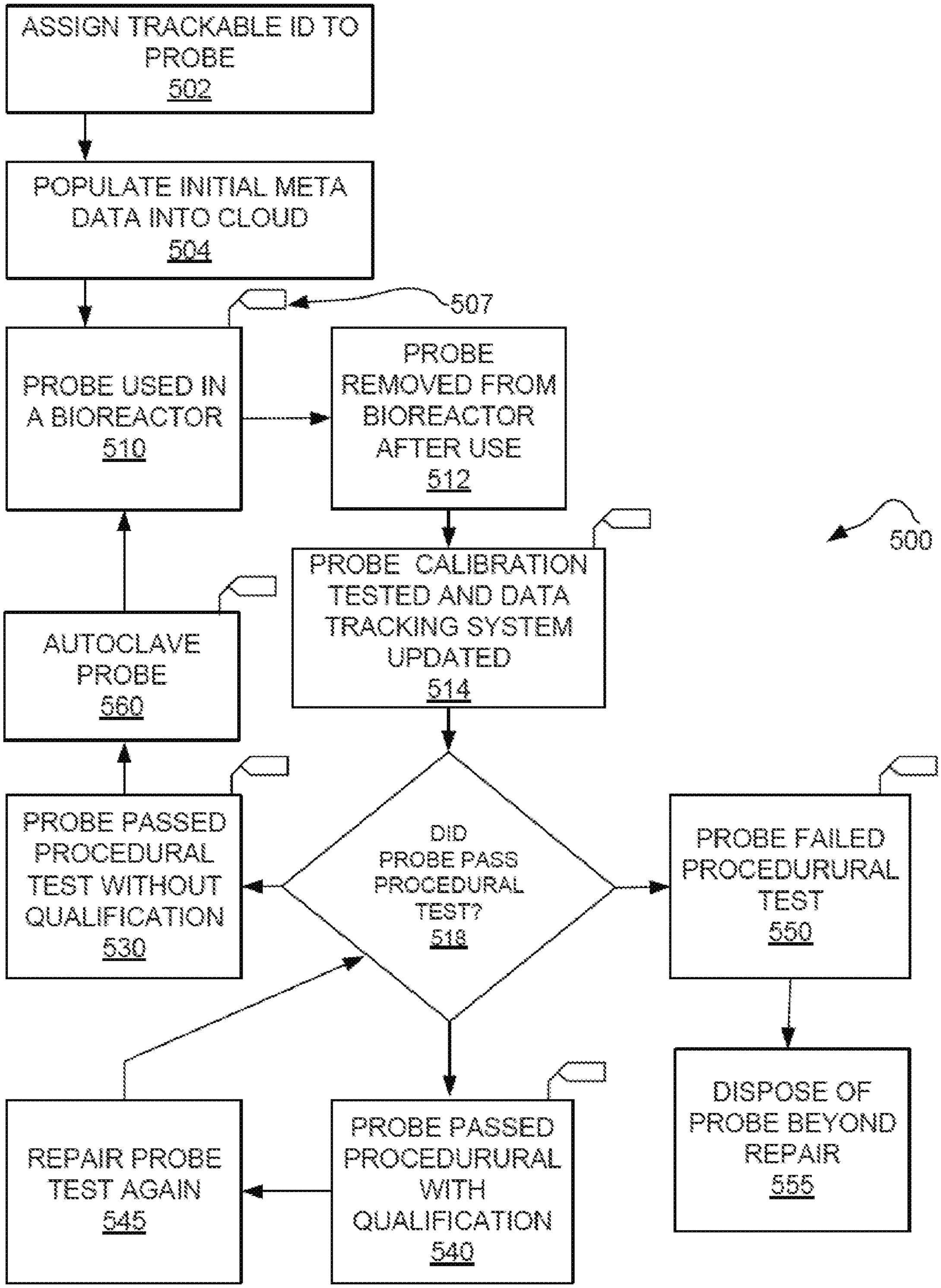
FIG. 5 is a flow chart of a method for tracking performance characteristics for one or more of the probes from FIGS. 1 and 2 according to an embodiment of the subject matter disclosed herein.

FIG. 5 is a flow chart of a method for tracking performance characteristics for one or more of the probes from FIGS. 1 and 2 according to an embodiment of the subject matter disclosed herein. The depicted here need not follow the exact steps as laid out and may deviate from the order in which the steps are described in accordance with embodiments of the subject matter disclosed herein. Further, the method may be iterative such that tracking data may be updated over time in a continuous and changing manner. As such, for the purposes of describing the iterative method, one convenient starting point is step 510 where a probe may be utilized in a biomanufacturing system for a specific experiment (e.g., the probe is placed into service by engaging an orifice of the top of a bioreactor vessel (145 of FIG. 1). It is understood that initial steps may have already been accomplished once the iterative process starts. These steps include affixing a trackable identification to a sensor probe configured to be used in the biomanufacturing system, the trackable identification associated with a data set stored in a data store at step 502. Further, initial meta data may be pH error code assigned to the respective data set about the associated sensor probe in the data store that is associated with the trackable identification. In this manner, all future additions, subtractions, and alterations to the meta data in the cloud data store will remain associated with this tracking ID representative of the actual sensor probe at step 504.

As alluded to above, the probe may be used in an experiment in a bioreactor of a biomanufacturing system at step 510. During this use, additional data may be determined and communicated to the meta data in the cloud data store about specific performance characteristics of the sensor probe during use such that in-use data updates and alters some meta data stored about the sensor probe. These in-use data points may include:

probe ID (all probes)
Probe lot (all)
probe SN (all)
probe health (cap quality for DO or % slope for pH)
probe operating hours (all)
probe powerups (all)
Probe temp sensor reading
pH raw slope
pH offset value
pH glass resistance
pH error code Such uploading of data and updating of the cloud data store is generally depicted in FIG. 5 by a flag 507. Thus, other uses of this flag 507 indicate that the cloud data store is being altered or modified in some manner in response to real-world events.

Once the experiment concludes, the sensor probe may be removed from the bioreactor at step 512. The contents of the bioreactor may be transferred to other containers not shown for intended uses not covered in the descriptions herein. However, the removed probes are then set to be cleaned, tested, and calibrated (if necessary) for repeated use. Prior to repeating (e.g., iterative) use, each probe is subject to one or more procedures at step 514. These procedures may include cleaning, testing, calibrating and the like. The cloud data may be updated accordingly after each procedure in response to determine these static performance characteristics (e.g., probe characteristics while not in use in any current experiment). For example, after a cleaning procedure, a use counter may be incremented in the cloud data. As another example, after a calibration testing, specific data about the calibration testing may be uploaded to the cloud data store (e.g., responsiveness (slope) to pH detection, responsiveness to dissolved oxygen detection, responsiveness to temperature detection, and the like).

Thus, a query step 518 is next after any specific procedural test that may result in one of three possible paths. As was noted earlier, flags 507 (not all of which are denoted by the designation numeral 507 on FIG. 5) indicate an updating of meta data in the cloud data store after each of the steps in these three paths. If the probe passes the procedural test without any qualification at step 530, the probe may then be sent though an autoclave procedure at step 560 (either alone, in a batch with other probes that have passed, or in-situ with a bioreactor and ready for an experiment). After autoclaving, the probe may then be ready for further service for a next use at a next iteration of the overall method at step 510 again.

Alternatively, after the procedural test at step 518, the probe may be determined to have failed the test at step 550 thereby resulting in simply retiring the probe from further use at step 555. Further yet, after the procedural test at step 518, the probe may be determined to have passed the test in a qualified manner at step 540. The qualified manner may be that the probe still maintains usefulness but may need recalibration to ensure proper sensitivity and responsiveness to detecting specific characteristics such as pH or dissolved oxygen. Thus, at step 545, remedial procedures may be taken to recalibrate or repair the probe for further testing until the probe can pass each procedural test. After testing again at step 518, the recalibrated or repaired probe is likely to pass the procedural tests and move the path that includes step 530. If all procedural tests cannot be passed (even after recalibration and/or repair), the probe will be removed from service though the path that includes step 560.

During the time in which the probe is removed from use and may be undergoing any number of procedures, specific meta data for inclusion and updating in the cloud data store may be realized. This trackable meta data includes:

slope delta from the ideal slope of a characteristic (e.g., pH) detection
slope offset delta (from zero) for characteristic (e.g., pH) detection
log of pH health and DO cap quality at the start of each run
log of pH slope and offset on arc bays
log of probe IDs
log of sensor lot data log of sensor serial numbers
count of the number of autoclave cycles
log of operating hours
log of total sensor powerups These metrics allow the tracking of the performance characteristics and lifetime of important and expensive probes in the biomanufacturing system that may lead to prevention of failed runs or lost data due to failed probes, to provision of additional traceability about sensor probes and their data during a given run, to estimate lifetime prediction of sensor probes to better determine amortized costs of each run, and to identification processes of strains that tend to harm the sensor probes.

As was discussed above, the procedural testing at step 518 may include any number of procedural tests for the subject probe. As one example, a pH testing and calibration procedure may include several sub-steps (not shown in FIG. 5). For example, a pH calibration procedure for probes may include moving probes to a potassium chloride (KCl) soak for overnight preparation. Probes that have soaked in the KCl soak overnight may then be ready for further procedural steps. Each probe may be loaded into staging equipment for rinsing the probes with a water solution prior to lowering the probes into a specific pH 7 solution. Using an associated computer calibration station communicatively coupled to each probe, each probe is then queried for readings (which should read neutral (e.g., pH of 7). If there is a deviation, the probe itself may require an offset to overcome the deviation when being used. This procedure may take up to 15 minutes to properly determine any deviation, drifting and/or offset. This procedure may then be repeated for solutions that are acidic (e.g., pH of 4) or basic (e.g., pH of 10) allowing additional localized offsets to be determined and assigned to the probe during recalibration.

As has been discussed, any number of steps indicate the storage and/or updating of cloud data about the fleet of probes in use as denoted by various flags 507 in the method of FIG. 5. Having a database stored in the cloud and updated throughout various activities described herein allows a manager of the fleet of probes to extract and generate useful data at any given time. Such data extraction includes the ability to graph data from the whole fleet of probes for the purpose of generating "Control Charts" which may assist in determining systematic challenges with calibration and probe lifetime, by looking at time-variant calibration performances. Further, a manager may identify the relative impact of different cell culture or fermentation processes on the probe fleet, so it can be better understood how much lifetime is depleted for a given process (e.g. for the purpose of pricing in the exact probe lifetime consumed by a given cell culture or fermentation process). Further yet, data may be extracted to inform optimal determination of probe lifetime and automated warnings to help retire probes before failure during any process.

With such a calibration data determination, prediction and tracking system in place, a fleet manager may gain the advantage of saving time and reducing manual labor and chances for errors for any given predicted use and failures. In turn, this facilitates additional uniformity and consistent calibration processes compared to manual calibrations on single probes.

Figure 6:
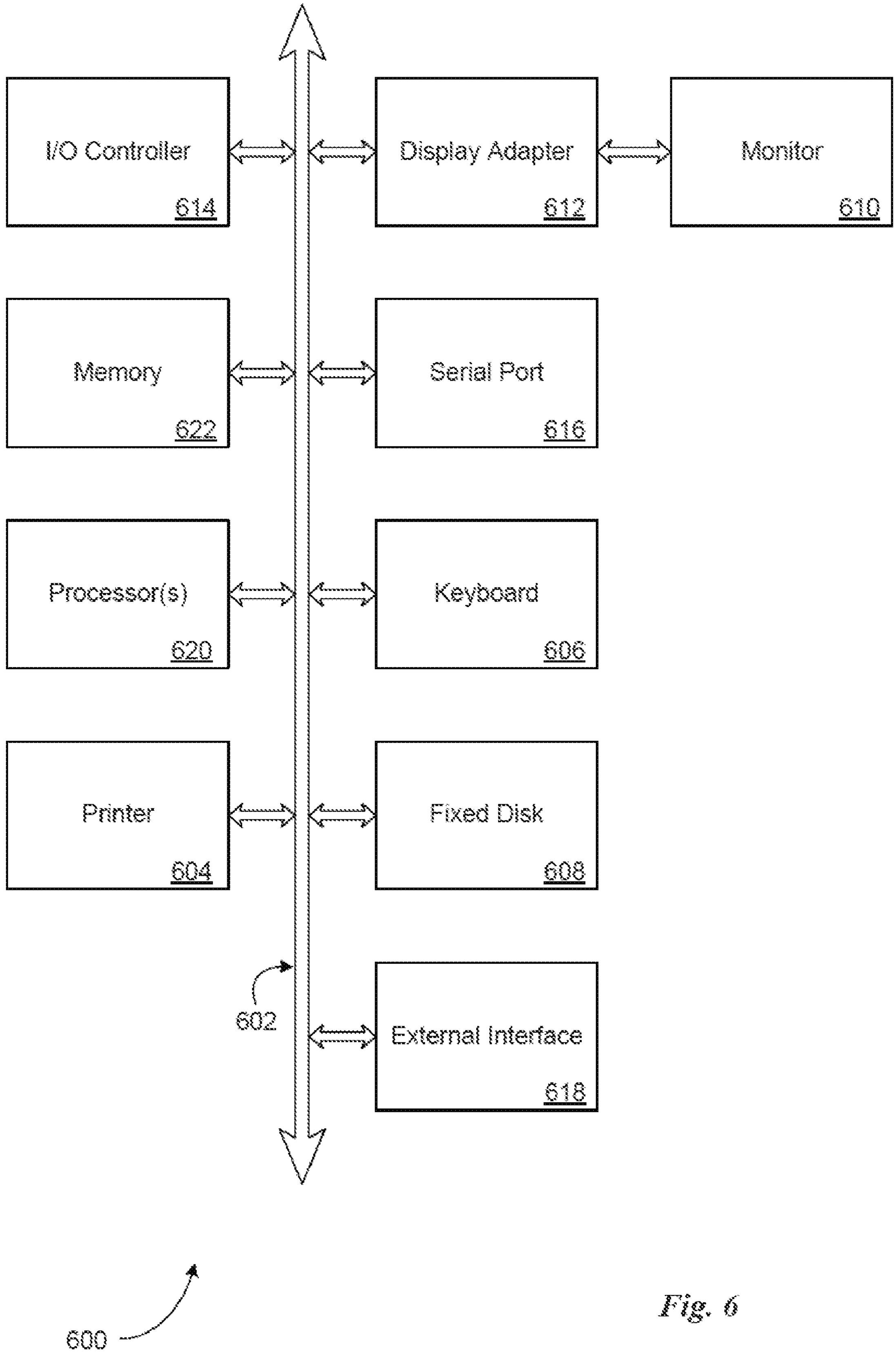
FIG. 6 is a diagram illustrating elements or components that may be present in a computer device or system configured to implement a method, process, function, or operation in accordance with an embodiment of the subject matter disclosed herein.

FIG. 6 is a diagram illustrating elements or components that may be present in a computer device or system configured to implement a method, process, function, or operation in accordance with an embodiment. In accordance with one or more embodiments, the system, apparatus, methods, processes, functions, and/or operations for enabling efficient configuration and presentation of a user interface to a user based on the user's previous behavior may be wholly or partially implemented in the form of a set of instructions executed by one or more programmed computer processors such as a master control unit (MCU), central processing unit (CPU), or microprocessor. Such processors may be incorporated in an apparatus, server, client or other computing or data processing device operated by, or in communication with, other components of the system. As an example, FIG. 6 is a diagram illustrating elements or components that may be present in a computer device or system 600 configured to implement a method, process, function, or operation in accordance with an embodiment. The subsystems shown in FIG. 6 are interconnected via a system bus 602. Additional subsystems include a printer 604, a keyboard 606, a fixed disk 608, and a monitor 610, which is coupled to a display adapter 612. Peripherals and input/output (I/O) devices, which couple to an I/O controller 614, can be connected to the computer system by any number of means known in the art, such as a serial port 616. For example, the serial port 616 or an external interface 618 can be utilized to connect the computer device 600 to further devices and/or systems not shown in FIG. 6 including a wide area network such as the Internet, a mouse input device, and/or a scanner. The interconnection via the system bus 602 allows one or more processors 620 to communicate with each subsystem and to control the execution of instructions that may be stored in a system memory 622 and/or the fixed disk 608, as well as the exchange of information between subsystems. The system memory 622 and/or the fixed disk 608 may embody a tangible computer-readable medium.

The present disclosures as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software.

Any of the software components, processes or functions described in this application may be implemented as software code to be executed by a processor using any suitable computer language such as, for example, Assembly language Java, JavaScript, C, C++, or Perl using, for example, conventional or object-oriented techniques. The software code may be stored as a series of instructions, or commands on a computer readable medium, such as a random-access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely intended to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments, and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present subject matter is not limited to the embodiments described above or depicted in the drawings, and various embodiments and modifications can be made without departing from the scope of the claims below.

What is claimed is:

1. A method for tracking performance characteristics of equipment, comprising:

affixing a trackable identification to a sensor probe configured to be used in a biomanufacturing system, the trackable identification associated with a data set stored in a data store;

assigning initial meta data to the respective data set about the associated sensor probe in the data store that is associated with the trackable identification;

using the sensor probe in an experiment in the biomanufacturing system;

querying a dynamic in-use performance characteristic of the sensor probe during the experiment and updating the meta data during the experiment in response to receiving the dynamic in-use performance characteristic;

after using the sensor probe, removing the sensor probe from the experiment, and testing the sensor probe for performance characteristics for determining usability of the sensor probe; and changing the meta data in the data store in response to the testing.

2. The method of claim 1, wherein the changing the meta data further comprises incrementing a counter for total number of uses of the associated sensor probe.

3. The method of claim 1, wherein the changing the meta data further comprises incrementing a counter for specific number and type of experiments.

4. The method of claim 1, wherein the changing the meta data further comprises adding calibration data after calibration testing.

5. The method of claim 1, further comprising calibrating the associated sensor probe in response to the testing.

6. The method of claim 1, further comprising autoclaving the associated sensor probe in response to the testing.

7. The method of claim 1, wherein the changing the meta data further comprises adding an indication to the meta data to retire the sensor probe from use in response to the testing.

8. The method of claim 1, wherein the changing the meta data further comprises adding an indication to the meta data to recalibrate the sensor probe in response to the testing.

9. The method of claim 1, wherein the testing further comprises testing responsiveness to pH detection.

10. The method of claim 1, wherein the testing further comprises testing responsiveness to dissolved oxygen detection.

11. The method of claim 1, wherein the testing further comprises testing responsiveness to temperature detection.

12. The method of claim 1, further comprising autoclaving the associated sensor probe in response to the testing.

13. A system for tracking performance characteristics of probes used in biomanufacturing procedures, the system comprising:

a bioreactor array that includes a plurality of vessels, each vessel having one or more sensor probes configured to be removably attached to a respective vessel;

a control computer communicatively coupled to each vessel in the bioreactor array, the control computer having a processor configured to execute instructions to control experiments in each vessel and to receive sensor data from each sensor probe; and a data store communicatively coupled to the control computer and configured to store meta data about each sensor probe, wherein, the control computer is further configured to:

determine dynamic in-use performance characteristics of a sensor probe during an experiment and update respective meta data in the data store during the experiment in response to receiving the dynamic in-use performance characteristics; and determine static not-in-use performance characteristics of the sensor probe during an experiment such that meta data in the data store is altered in response to the receiving the static not-in-use performance characteristics; and a user interface computer coupled to the control computer through a computer network and configured to provide an interface for a remote user to interact with the control computer.

14. The system of claim 13, wherein the meta data for each sensor probe includes one or more of the group that comprises number of uses, duration of use, number of powerups, number of calibrations, number of autoclaves, slope of calibration, type of experiment, responsiveness to pH detection, responsiveness to DO detection, and responsiveness to temperature detection.

15. The system of claim 13, further comprising a calibration station coupled to the control computer and configured to calibrate one or more sensor probes in response to the determination of static not-in-use performance characteristics.

16. The system of claim 13, wherein the dynamic in-use performance characteristics relate to one or more of measurement data, probe health in use, and instrument status.

17. The system of claim 13, wherein the static not-in-use performance characteristics relate to one or more of probe health, recalibration, and instrument log maintenance.

18. The system of claim 13, further comprising a testing station coupled to the control computer and configured to test one or more sensor probes for usability of the one or more sensor probes in response to the determination of static not-in-use performance characteristics.

19. A computer-executable method for tracking performance characteristics of equipment embodied in a non-transitory computer-readable medium, that when executed by a computer processor cause the computer system to:

assign a trackable identification to a sensor probe configured to be used in a biomanufacturing system, the trackable identification associated with a data set stored in a data store;

assign initial meta data to the respective data set about the associated sensor probe in the data store that is associated with the trackable identification;

determine dynamic in-use performance characteristics of the sensor probe during use of the sensor probe in the biomanufacturing system;

change the meta data in the data store during the use of the sensor probe in response to receiving the determined dynamic in-use performance characteristics;

test the sensor probe for static not-in-use performance characteristics after use in the biomanufacturing system for determining usability of the sensor probe; and change the meta data in the data store in response to the determined static performance characteristics.

20. The computer-executable method of claim 19, further comprising determining that the sensor probe is unfit for further use in response to determining the dynamic in-use performance characteristics or the static not-in-use performance characteristics.

* * * * *